(12) United States Patent
Duval (10) Patent No.: US 7,665,768 B2
(45) Date of Patent: Feb. 23, 2010

(54) MULTIPURPOSE AND EVOLUTIVE ROAD TRAILER

(75) Inventor: Bernard Duval, Vierzon (FR)

(73) Assignee: SMART Transport Solutions, Fox Lake, WI (US)

( * ) Notice: Subject to any disclaimer, the term of this patent is extended or adjusted under 35 U.S.C. 154(b) by 166 days.

(21) Appl. No.: 10/592,495

(22) PCT Filed: May 21, 2004

(86) PCT No.: PCT/FR2004/001259

§ 371 (c)(1),
(2), (4) Date: Jun. 7, 2007

(87) PCT Pub. No.: WO2005/097586

PCT Pub. Date: Oct. 20, 2005

(65) Prior Publication Data

US 2007/0296197 A1 Dec. 27, 2007

(30) Foreign Application Priority Data

Mar. 11, 2004 (FR) .................................. 04 02536

(51) Int. Cl.
*B62D 63/06* (2006.01)
(52) U.S. Cl. ...................... 280/789; 280/656; 280/785; 296/26.05; 296/32; 296/36; 296/183.1; 296/186.1; 296/186.5
(58) Field of Classification Search ................ 280/656, 280/785, 789; 296/26.05, 32, 36, 183.1, 296/186.1, 186.5
See application file for complete search history.

(56) References Cited

U.S. PATENT DOCUMENTS

| | | | |
|---|---|---|---|
| 1,022,266 | A | 4/1912 | Saltzman |
| 2,879,072 | A | 3/1959 | Rear et al. |
| 2,986,401 | A | 5/1961 | Altadonna |
| 3,141,698 | A | 7/1964 | Kandle |
| 3,612,600 | A | 10/1971 | Salichs |
| 3,692,354 | A | 9/1972 | Tuerk |

(Continued)

FOREIGN PATENT DOCUMENTS

DE    EP 0 235 330 A1  *  3/1986

(Continued)

OTHER PUBLICATIONS

Office Action; U.S. Appl. No. 11/807,318; Inventor: Bernard Duval; Date: Feb. 20, 2009; pp. 5.

(Continued)

*Primary Examiner*—Ruth Ilan
*Assistant Examiner*—James English
(74) *Attorney, Agent, or Firm*—Ryan Kromholz & Manion S.C.

(57) ABSTRACT

The invention concerns a road trailer whose frame consists of profiles having a fin to support the floor and grooves on their upper and lower faces able to retain in rotation bolt heads and the lower edges of sidewalls (10). The side members and cross bars are joined by corner pieces which have a vertical orifice to receive the lower end of a post (9) comprising orthogonal grooves housing the side edges of the sidewalls (10). The corner pieces (30) have two perpendicular arms respectively fitted into the adjacent ends of profiles forming the frame. Mounting of the elements requires little tooling.

12 Claims, 11 Drawing Sheets

U.S. PATENT DOCUMENTS

| | | | |
|---|---|---|---|
| 3,794,375 A | | 2/1974 | Woodward |
| 3,834,753 A | | 9/1974 | Heiter et al. |
| 3,837,702 A | | 9/1974 | Case |
| 3,871,702 A | * | 3/1975 | Glassmeyer ............... 296/36 |
| 3,940,179 A | * | 2/1976 | McBride .................. 296/43 |
| 4,042,275 A | * | 8/1977 | Glassmeyer et al. ......... 296/43 |
| 4,067,601 A | * | 1/1978 | Tuerk ...................... 296/36 |
| 4,427,230 A | * | 1/1984 | Avny ....................... 296/43 |
| 4,529,220 A | | 7/1985 | Wright et al. |
| 4,582,333 A | | 4/1986 | Doering |
| 4,995,129 A | | 2/1991 | Comardo |
| 5,320,396 A | * | 6/1994 | Petelka .................... 296/43 |
| 5,480,180 A | | 1/1996 | Fuller et al. |
| 5,775,711 A | * | 7/1998 | Floe ..................... 280/405.1 |
| 5,947,519 A | * | 9/1999 | Aloe et al. ............... 280/785 |
| 6,446,414 B1 | | 9/2002 | Bullard et al. |
| 6,470,990 B1 | * | 10/2002 | Panoz .................... 180/311 |
| 6,511,092 B1 | | 1/2003 | Chepa |
| 6,536,824 B2 | | 3/2003 | Anderson |
| 6,708,995 B2 | | 3/2004 | Norris |
| 6,751,914 B2 | * | 6/2004 | Zeh et al. ................. 52/239 |
| 6,802,521 B1 | | 10/2004 | Boughton |
| 7,097,182 B1 | | 8/2006 | Liu |
| 7,150,127 B2 | * | 12/2006 | Underwood et al. ......... 52/36.1 |
| 7,175,205 B2 | | 2/2007 | Simpson |
| 7,455,312 B2 | | 11/2008 | Senatore |
| 2003/0193156 A1 | | 10/2003 | Norris |
| 2003/0214117 A1 | | 11/2003 | Steins et al. |
| 2004/0135349 A1 | | 7/2004 | Palmer |
| 2005/0093273 A1 | | 5/2005 | McDonell |
| 2006/0091646 A1 | | 5/2006 | Steins |
| 2007/0262562 A1 | | 11/2007 | Senatore |

FOREIGN PATENT DOCUMENTS

| | | |
|---|---|---|
| DE | 100 413 239 A | 1/2001 |
| DE | 10161643 A1 * | 7/2003 |
| GB | 2347652 A * | 9/2000 |

OTHER PUBLICATIONS

Response to Office Action; U.S. Appl. No. 11/807,318; Inventor: Bernard Duval; Date: Aug. 3, 2009; pp. 10.

* cited by examiner

FIG.16B

MULTIPURPOSE AND EVOLUTIVE ROAD TRAILER

BACKGROUND OF THE INVENTION

The invention pertains to the area of road trailers intended to be towed by a motor vehicle.

More precisely, it concerns a trailer comprising at least one cross axle connected to two wheels by side suspension arms, a tongue for hitching onto the vehicle, and having a rectangular frame supporting a floor optionally with sidewalls, said frame having two parallel side members, one front cross bar and one rear cross bar.

These trailers, towed by vehicles, are frequently used for transporting luggage, materials or sports machines.

These trailers and in particular the frame are generally made from metal beams cut to the right length and welded together. These operations, in particular the welding operation, require welding stations and qualified personnel. Such operations can only be conducted in workshops equipped with heavy, specific tooling. Finally the transport of the fully assembled trailers to customers requires major logistics.

SUMMARY OF THE INVENTION

The purpose of the invention is to provide a trailer which can be easily assembled, without requiring any welding, from elementary parts that are not voluminous, and are delivered to the customer in separate parts.

The invention attains this object by the fact that the side members and cross bars are made from metal profiles that are joined at their adjacent ends by means of corner pieces having two perpendicular arms which respectively fit into said adjacent ends and which are also provided with a through orifice perpendicular to the plane of said arms, said side members and said cross bars comprising on their inner face comprising a fin extending inwardly into the frame and which is intended to give support to the floor, and on their lower and upper faces a groove leading into a channel able to receive bolt heads and the lower edges of the sidewalls and to immobilise the same in rotation, and by the fact that it also comprises four tubular corner posts whose lower ends fit into the orifices of the corner pieces, said posts having two vertical grooves along orthogonal planes intended to receive side edges of the sidewalls.

With this arrangement, the mounting of the frame is made by assembling the side members and cross bars by means of the corner pieces using no tools other than a key. The side members and cross bars may be cut to the right length in workshops specialized for this task and transported to the site of assembly as narrow-width products which considerably reduces their transport volume. The corner pieces and posts may be produced in other workshops.

Advantageously, the posts are made from a profile having two orthogonal grooves and are equipped at their lower end with an assembly piece for mounting onto a corner piece.

This assembly piece has a lower part which fits into the orifice of a corner piece and an upper part which fits into the lower end of a post profile.

The assembly piece also comprises angle positioning means and clipping means which cooperate with conjugate angle positioning means and clipping means respectively provided on the corner pieces and the lower ends of the post profiles. Preferably the angle positioning means comprise a vertical groove provided on one of the pieces and a protuberance provided on the other piece.

The clipping means comprise a protuberance formed on an elastic tongue of the assembly piece which is able to enter a hole or slit provided in a post profile or corner piece.

Advantageously, the sidewalls on their lower edge have means able to slide within the upper groove of a side member or front cross bar during assembly.

DESCRIPTION OF THE DRAWINGS

Other characteristics and advantages of the invention will be more readily apparent on reading the following description given as an example with reference to the appended drawings in which:

FIGS. 16A and 18B give a side view and front view of the possible stacking of several trailers.

DETAILED DESCRIPTION

Figure 1:
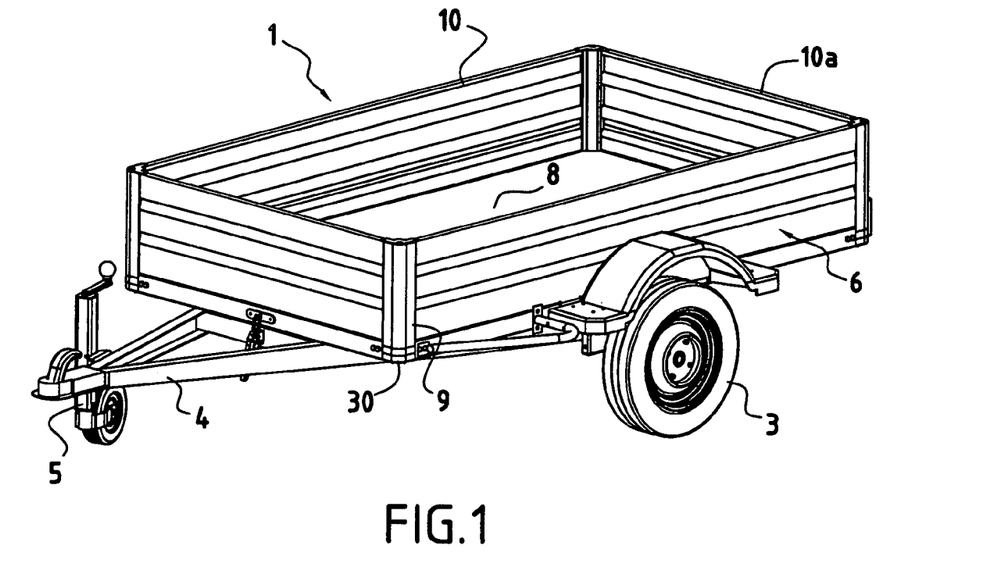
FIG. 1 is a perspective view of a road trailer according to the invention.
Figure 2:
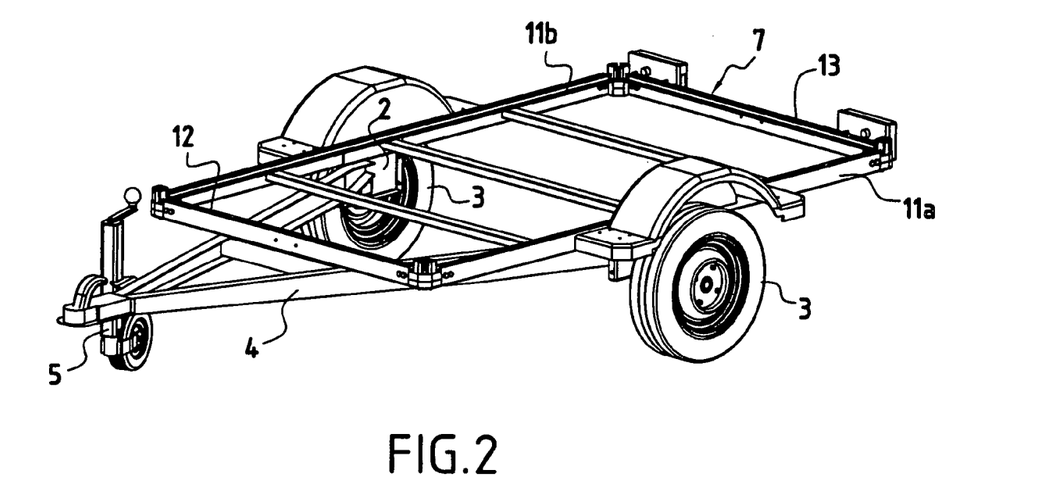
FIG. 2 is a perspective view of the trailer in FIG. 1 without the sidewalls, the corner posts and floor.

FIGS. 1 and 2 show a trailer 1 intended to be towed by a motor vehicle, which comprises an axle 2 connected to two wheels 3 by suspension arms 19 (see FIGS. 10 and 11), and joined to a V-shaped trailer tongue 4 intended to hitch said trailer to the rear of a vehicle, the front end of said tongue 4 comprising a height-adjustable bar 5. On the axle 2 and tongue 4 a platform is mounted consisting of a rectangular frame 7 giving support to a floor 8 and optionally a body 6 consisting of four corner posts 9 and sidewalls 10, the tail wall 10a preferably being pivot-mounted around a lower transverse pin.

Figure 3:
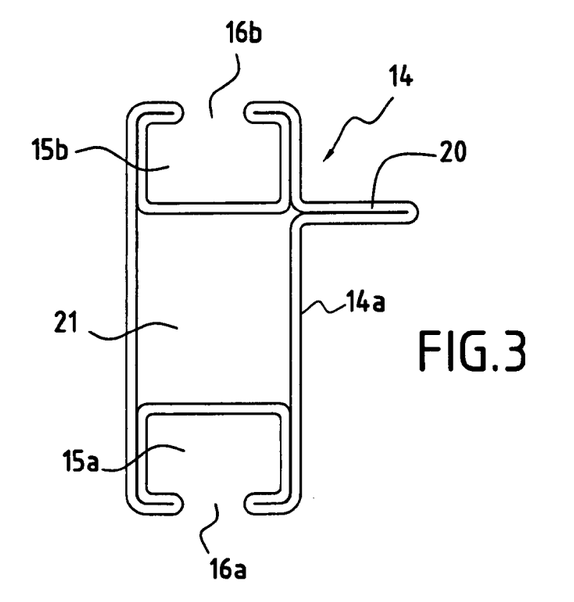
FIG. 3 is a cross-sectional view of a profile used to manufacture the side members and cross bars.
Figure 4:
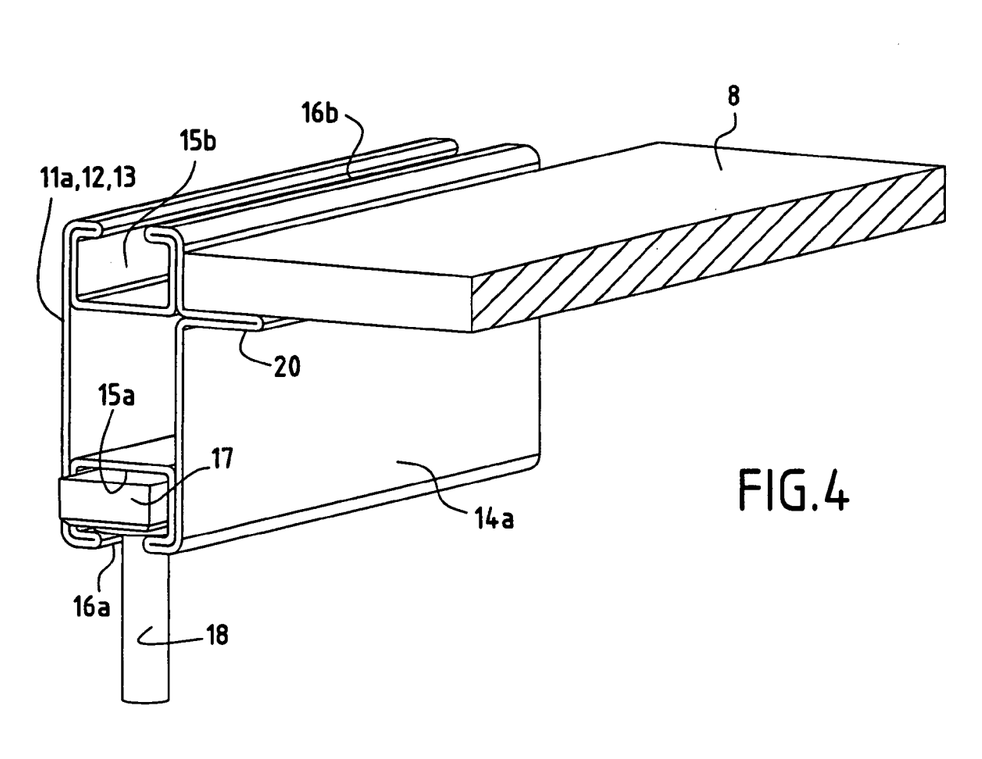
FIG. 4 is a perspective view of a side member supporting the floor and whose lower groove comprises bolt heads.
Figure 12:
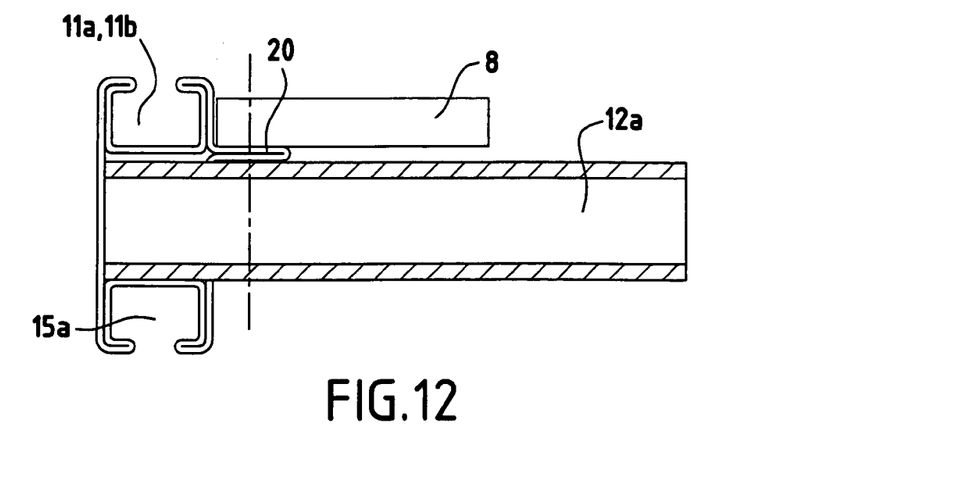
FIG. 12 shows how the end of an intermediate cross bar fits into a side member.

The frame 7 comprises two parallel side members 11a, 11b, a front cross bar 12 and a rear cross bar 13. The side members 11a, 11b and cross bars 12 and 13 are made from a profile 14 shown FIGS. 3 and 4 of globally rectangular cross-section which in its upper region and lower region comprises two grooves referenced 15a in the lower region and 15b in the upper region which lead into the lower and upper faces respectively of profile 14 via longitudinal channels 16a and 16b. Grooves 15a are able to immobilise in rotation the heads 17 of bolts 18 whose shanks pass through channel 16a. Groove 15b is able to receive the sidewalls of the trailer. Profile 14 on a side face 14a, intended to be positioned on the inner side of frame 7, has a fin 20 arranged substantially in the plane of the bottom of the upper groove 15b and intended to give support to the floor 8, the latter being attached onto the side members 11a, 11b and cross bars 12 and 13 by riveting. Side members 11a, 11b and cross bars 12, 13 between the bottoms of grooves 15a and 15b therefore have an inner cavity 21 open at the ends of profile 14. The inner side face 14a of side members 11a, 11b, underneath the fins 20, may also have openings intended to receive the ends of intermediate cross bars 12a connecting side members 11a, 11b and parallel to the front 12 and rear 13 cross bars as shown FIG. 12. The under face of the ends of the intermediate cross bars 12a bears upon the bottom of the lower groove 15a of side members 11a, 11b, while the fins 20 of the side members bear upon the upper face of the intermediate cross bars 12a. Rivets are used to join together the floor 8, fins 20 and intermediate cross bars 12a.

The side members 11a, 11b and cross bars 12 and 13 are joined together at their adjacent ends by corner pieces or angle brackets 30 which each comprise two arms 31a, 31b, orthogonal to one another and able to fit into cavities 21 and 15a at the adjacent ends of a side member and cross bar. These arms 31a, 31b have holes 32 facing holes provided in the side surfaces at the ends of the side members and cross bars to fix the angle brackets 30 by bolting.

Figure 5:
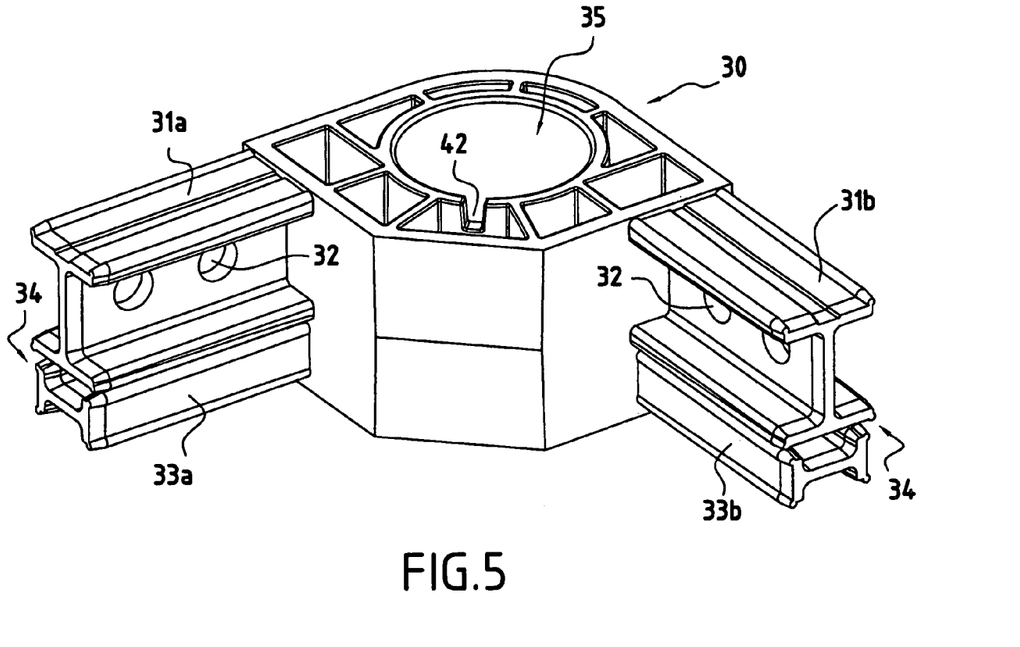
FIG. 5 is a perspective view of a corner piece.

As shown FIG. 5, the angle brackets comprise two pairs of superimposed arms 31a, 33a and 31b, 33b orthogonal to one another and separated by a slot 34, the upper arms 31a, 31b being housed in cavities 21 and grooves 15a and the lower arms 33a, 33b being housed in the lower grooves 15a of a side member 11a or 11b and a cross bar 12 or 13, the wall separating the groove 15a from the cavity 21 being housed in a slot 34.

Each corner piece or angle bracket 30 also has a through orifice 35 that is globally cylindrical and perpendicular to the plane defined by arms 31a and 31b. This orifice 35 is intended to receive the lower part 40a of an assembly piece 40 whose upper part 40b fits into a cavity provided on the lower end of a post profile 9.

Figure 6:
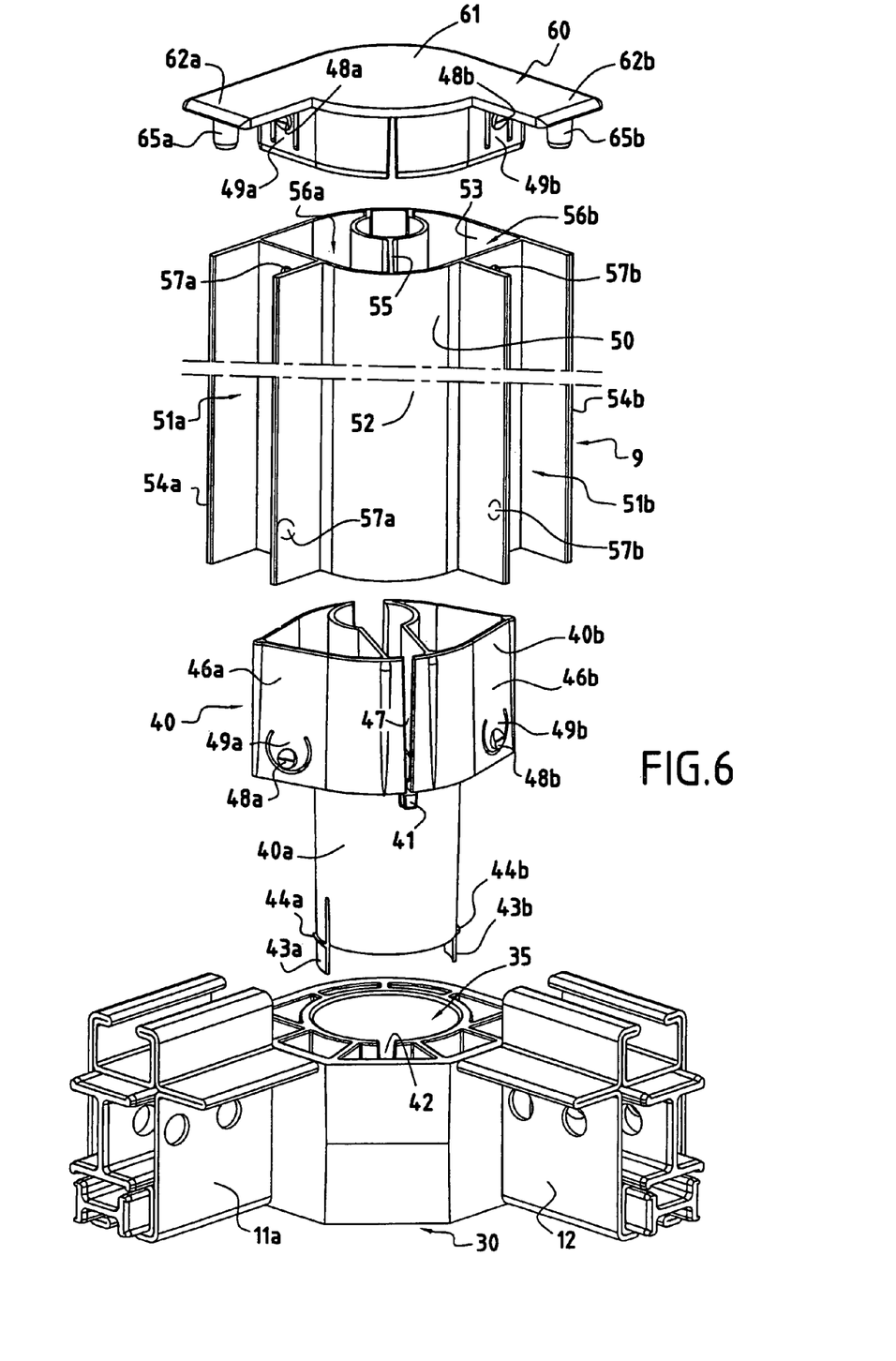
FIG. 6 is a perspective, exploded view of a corner piece fitted into a side member and a cross bar, of a post with its assembly piece and of a post cover.

As can be seen FIG. 6, the lower part 40a of the assembly piece 40 is globally cylindrical and its diameter is substantially equal to or slightly smaller than the diameter of orifice 35. In its upper zone it has a lug 41 which comes to be housed in a notch 42 provided in the upper zone of the wall delimiting orifice 35. The lower part 40a at its lower end also has elastic tongues 43a, 43b which on their outer face have protuberances or hooks 44a, 44b intended to cooperate with slots provided in the wall delimiting orifice 35 or with the lower end of this wall to immobilise the assembly piece 40 when it is mounted on angle bracket 30.

The lug 41 and notch 42 ensure the angle positioning of the assembly piece 40 with respect to angle bracket 30, enabling blind assembly. When the lug 41 is positioned in notch 42, the protuberances 44a and 44b move away from each other radially on account of the elasticity of tongues 43a and 43b, and immobilise the assembly piece 40 on corner piece 30 by clipping. When the lower part 40a of the assembly piece 40 slides within orifice 35, the protuberances 44a and 44b retract into the orifice 35 on account of the elasticity of the tongues 43a and 43b.

Figure 7:
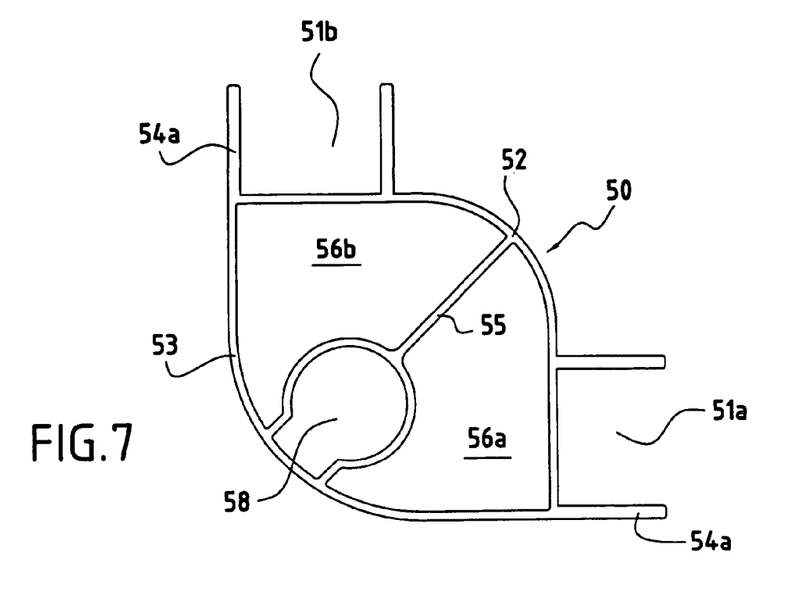
FIG. 7 is a cross-section of a front post.

Each post 9 is made from a profile 50 whose section is shown FIG. 7. This section is adapted in relation to the geometry of the corner piece 30. This profile comprises in particular two orthogonal U-section grooves 51a, 51b intended to house and retain the side edges of two adjacent sidewalls; a wall 52 of quarter-cylinder shape joining the bottoms of the two grooves 51a et 51b and which is intended to lie against the wall delimiting orifice 35 of a corner piece 30; and a wall 53 connecting the outer wings 54a and 54b of grooves 51a and 51b and following the contour of the outer wall of corner pieces 30 after the mounting of assembly pieces 40 and profiles 50 of posts 9. Walls 52 and 53 are joined by a rigidifying sheet 55 which delimits the inside of post 9 into at least two cavities 56a and 56b substantially symmetrical with respect to sheet 55. Preferably sheet 55 close to outer wall 53, also delimits a cylindrical cavity 58 whose upper end can receive the ends of hoops for a tarpaulin covering the body 6.

The upper part 40b of the assembly piece 40 is intended to be housed in cavities 56a and 56b at the lower end of a post profile 9. For this purpose, the upper part 40b comprises two blocks 46a and 46b separated by a slot 47 intended to house the sheet 55. Blocks 46a and 46b are arranged symmetrically either side of this slot 47 and have a configuration adapted to the configuration of cavities 56a and 56b. The peripheral walls of blocks 46a and 46b also comprise protuberances 48a and 48b at the lower ends of elastic tongues 49a and 49b. These protuberances 48a and 48b are intended to enter into holes 57a, 57b provided in the bottoms of grooves 51a, 51b of the post profile 9 to immobilise the post 9 after assembly.

A cover 60 may be mounted on the upper end of post 9. The lower part of this cover 60 is similar to the lower zone of the upper part 40b of the assembly piece 40. In particular it comprises protuberances 48a and 48b on the elastic tongues 49a and 49b able to cooperate with holes 57a and 57b provided at the upper end of post 9. The upper wall 61 of cover 60 has orthogonal extensions 62a, 62b which come to cover grooves 51a and 51b of post 9. These extensions on their lower face have lugs 65a, 65b used to lock the sidewalls 10. The upper wall 61 may have an orifice in the continuation of the cylindrical cavity 58 of post profiles 50.

Figure 8:
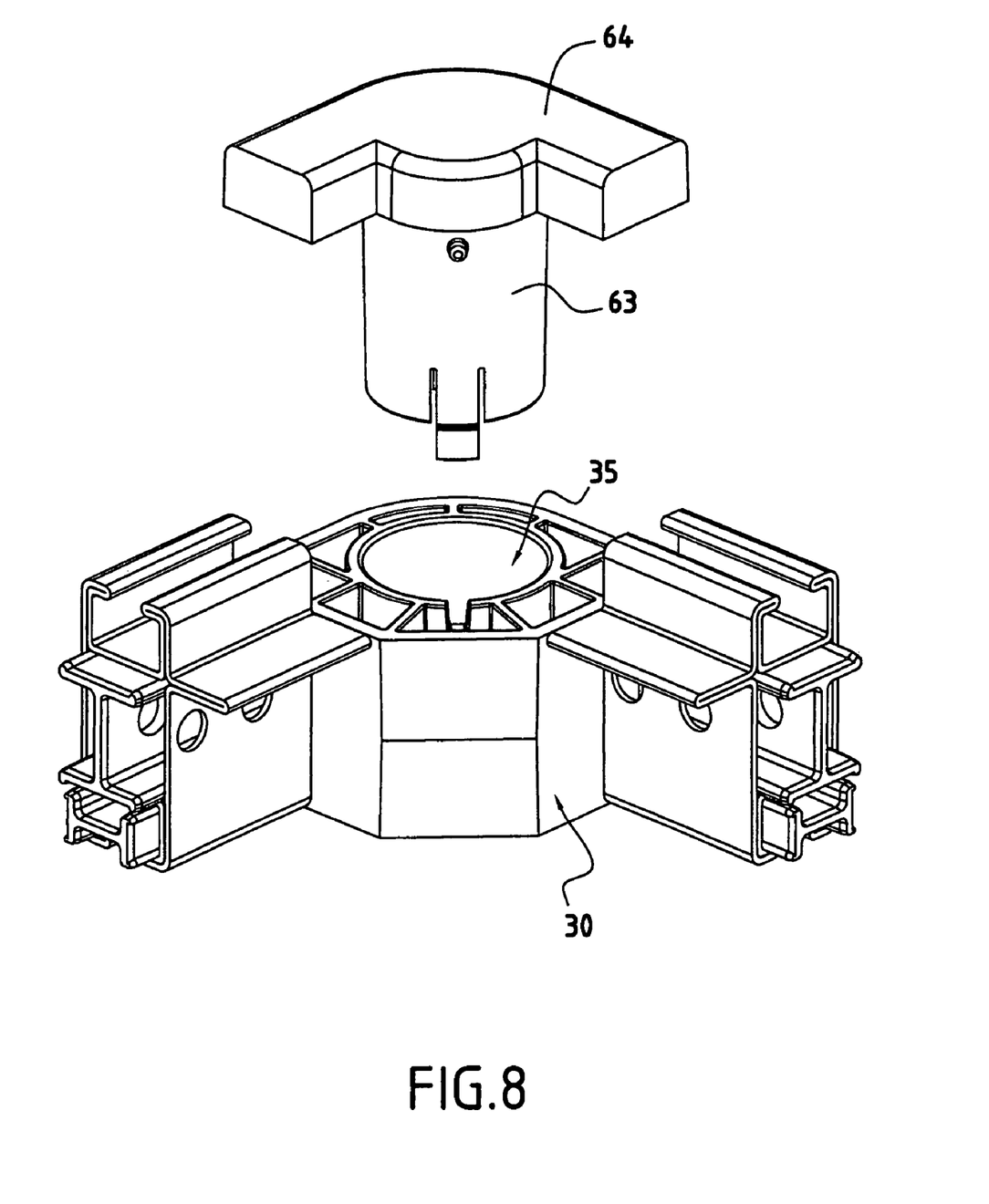
FIG. 8 shows a plug for a corner piece.

FIG. 8 shows a platform plug 64 which adapts directly onto a corner piece 30. This plug 64 comprises a lower part 63 identical to the lower part 40a of the assembly piece. This plug 64 is used when the trailer comprises only the platform without the sidewalls. The upper grooves 15b of the side members and cross bars are then used as anchoring points for devices to fix straps or other fastening elements.

It is to be noted that on the rear posts 9 of the trailer, the wing 54a of groove 51a may be eliminated to transform groove 51a into a rabbet to receive a side edge of a tipping tail wall.

FIGS. 9A to 9D show different types of sidewalls 10 able to be mounted on the side members 11a and 11b and front cross bar 12. They may also be mounted on the rear cross bar 13, but preferably the tail wall 10a is a door that is swing-mounted around a horizontal pin on the rear cross bar 13.

Figure 9A:
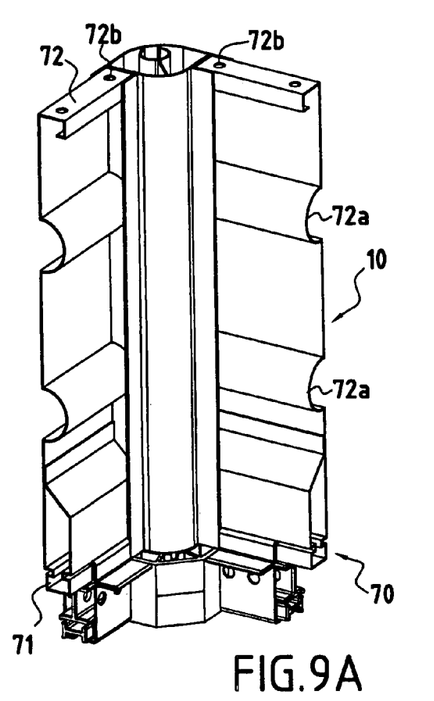
FIGS. 9A to 9D show the assembly of different types of sidewalls on a side member and the front cross bar.

The special characteristic of sidewalls 10 according to the invention is that their side edges are retained in the opposite facing grooves 51a, 51b of two posts 9 and that their lower edge 70 comprises means 71 able to slide, during assembly, in the upper groove 15b of a side member 11a, 11b or cross bar 12. FIG. 9A shows a sidewall 10 drawn from sheet metal that is cold formed so that the lower edge 70 has a configuration that is complementary to that of groove 15b. Its upper edge 72 has folded back parts in the sheet metal which engage in grooves 51a and 51b of posts 9. On their end parts, these folded back parts 72 have holes 72b to receive lugs 65a and 65b of covers 60. Sidewall 10 also has horizontal rigidifying ripples 72a of semi-cylindrical section.

Figure 9B:
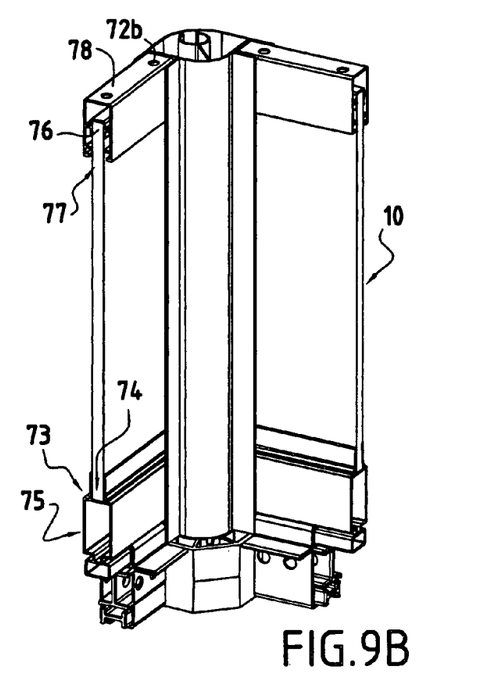

FIG. 9B shows a sidewall 10 made from a wood panel whose lower edge 73 engages in the upper groove 74 of a profile 75 whose lower part engages by sliding in the upper groove 15b of a side member 11a, 11b or cross bar 12, 13. The upper edge 76 of the wood panel is also engaged in groove 77 of a profile 78 whose width is equal to the width of grooves 51a and 51b of posts 9 and which also has holes 72b to receive lugs 65a, 65b of covers 60.

Figure 9C:
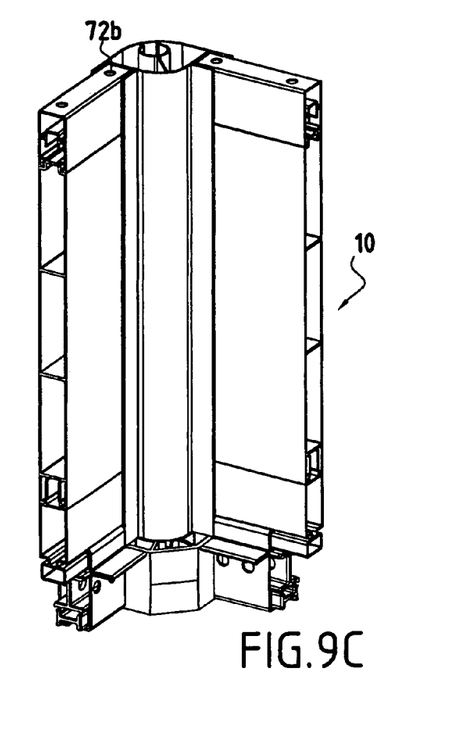

FIG. 9C shows a third type of sidewall, made in aluminium or in a plastic material, in a single piece or in several inter-fitting pieces one on top of the other. The lower edge of these sidewalls 10 is configured to permit is assembly onto a side member or a cross bar by sliding.

Figure 9D:
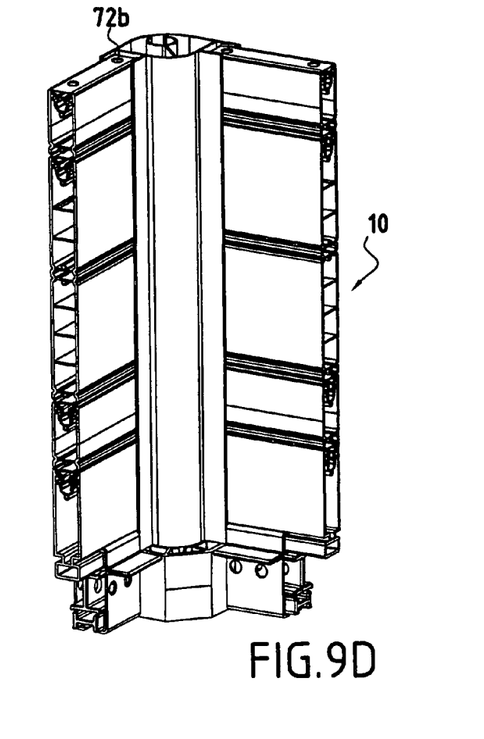

FIG. 9D gives a fourth example of a sidewall made in an extruded plastic material which comprises several superimposed elements which fit into each other.

Figure 10:
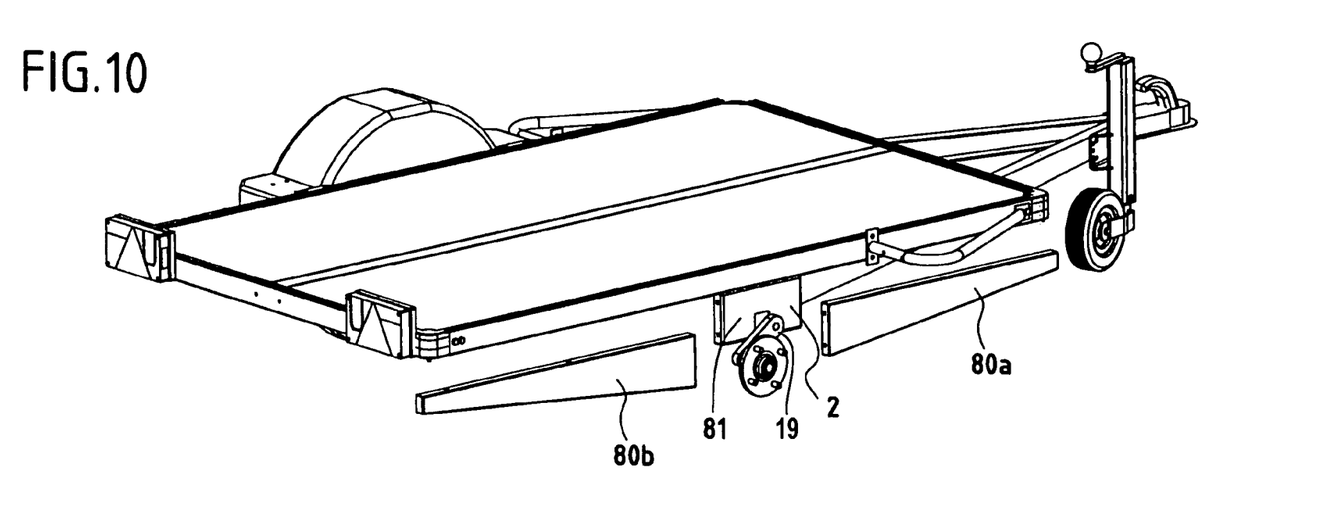
FIG. 10 is partially exploded view of a trailer comprising bracing beams under the side members.
Figure 11:
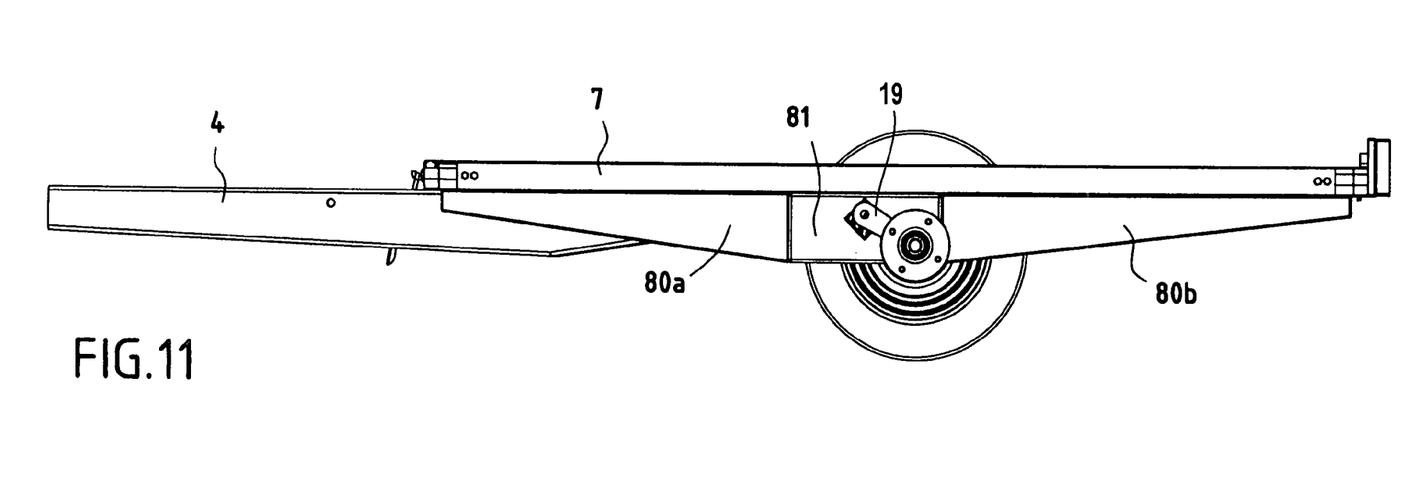
FIG. 11 is a side view of the trailer in FIG. 10.

FIGS. 10 and 11 show a trailer 1 in which the side members 11a and 11b are reinforced by two bracing beams, one 80a at the front of the axle 2 and the other 80b at the rear of the axle 2. These beams 80a and 80b in inverted 90° U-shape comprise on their upper wing a plurality of holes to insert bolts whose heads 17 are trapped in the lower groove 15a of side members 11a and 11b. The neighbouring ends of the two beams 80a and 80b comprise folded back parts which are pierced for their attachment by bolting to the sides of plates 81 of axle 2 so as to form a single beam underneath the platform of the trailer. The section of beams 80a and 80b is calculated in relation to the intended carrying load of the trailer. In the example shown FIG. 10, the trailer 1 only has one axle 2. Evidently, this trailer could comprise tandem axles without departing from the scope of the invention.

Figure 13:
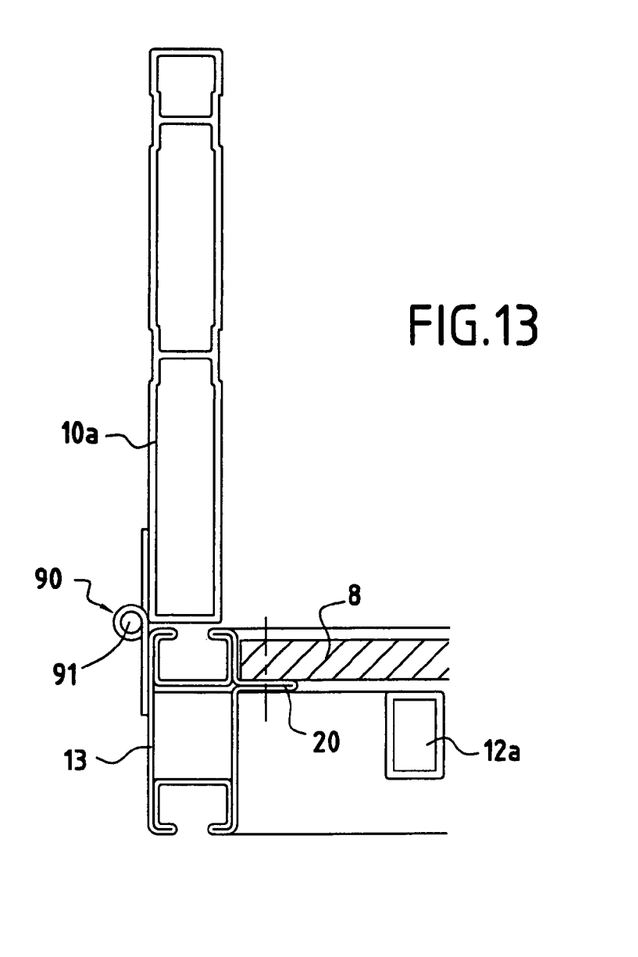
FIG. 13 is a side view of the tail wall.

FIG. 13 shows an example of the assembly of a tail wall 10a on the rear cross bar 13 by means of hinges 90 having a horizontal articulating pin 91.

Figure 14:
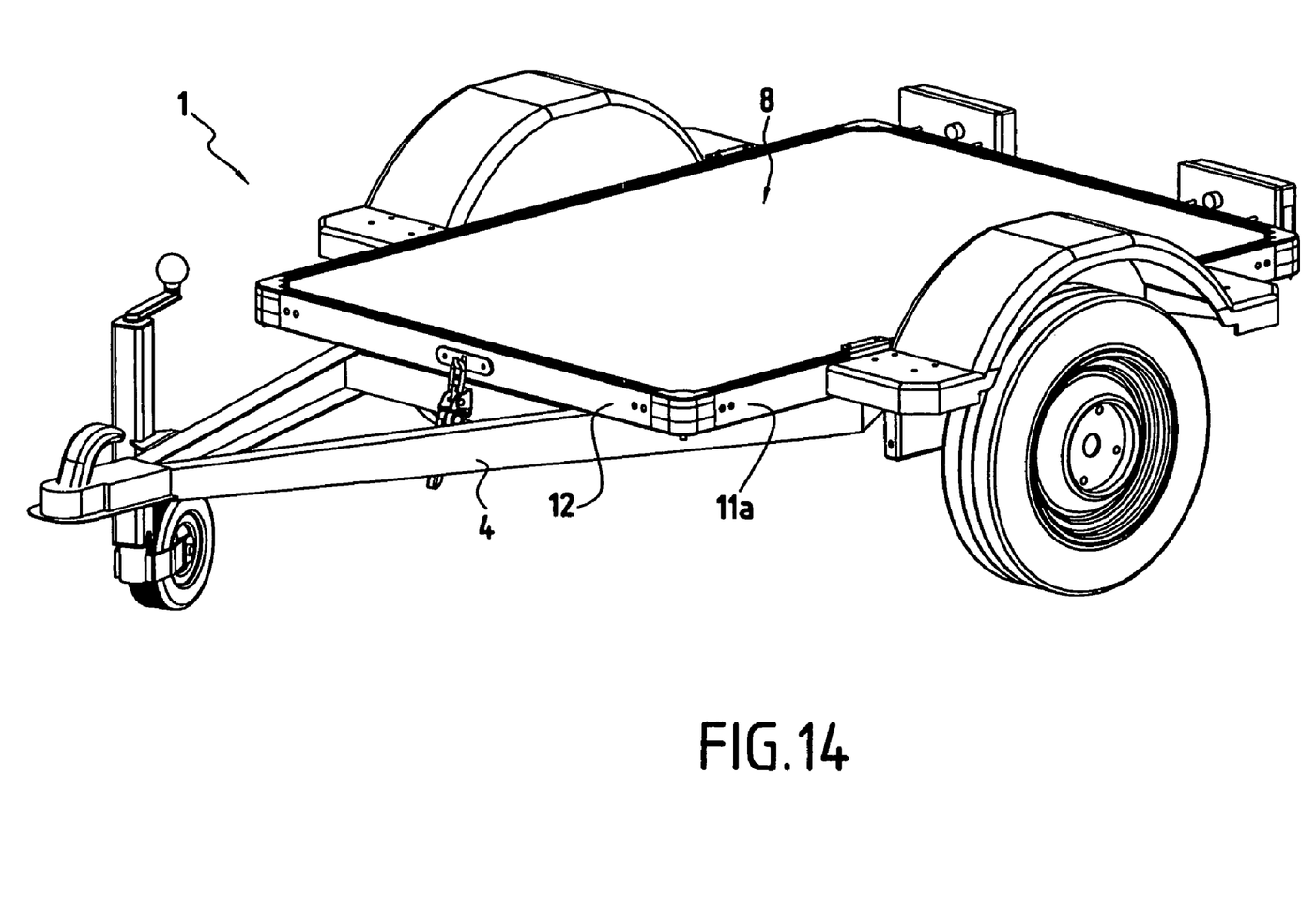
FIG. 14 is a perspective view of an open trailer.

FIG. 14 shows a trailer with no sidewalls. The corner pieces 30 are covered by plugs 64 whose upper face lies within the continuity of floor 8. When this trailer is used for the transport of sports machines the floor 8 may be equipped with wedge blocks to lock the machine wheels in position, and loading ramps may be articulation-mounted on the rear cross bar 13.

It is to be noted also that the sidewalls 10 may be placed in position by sliding on side members 11a and 11b and cross bar 12 before placing in position the assembly piece 40 and posts 9.

The side members 11a, 11b cross bars 12 and 13 are made by cold profiling of metal strips. The corner pieces 30 and assembly pieces 40 are preferably made by casting a plastic material or metal, such as aluminium or an aluminium alloy.

Figure 15:
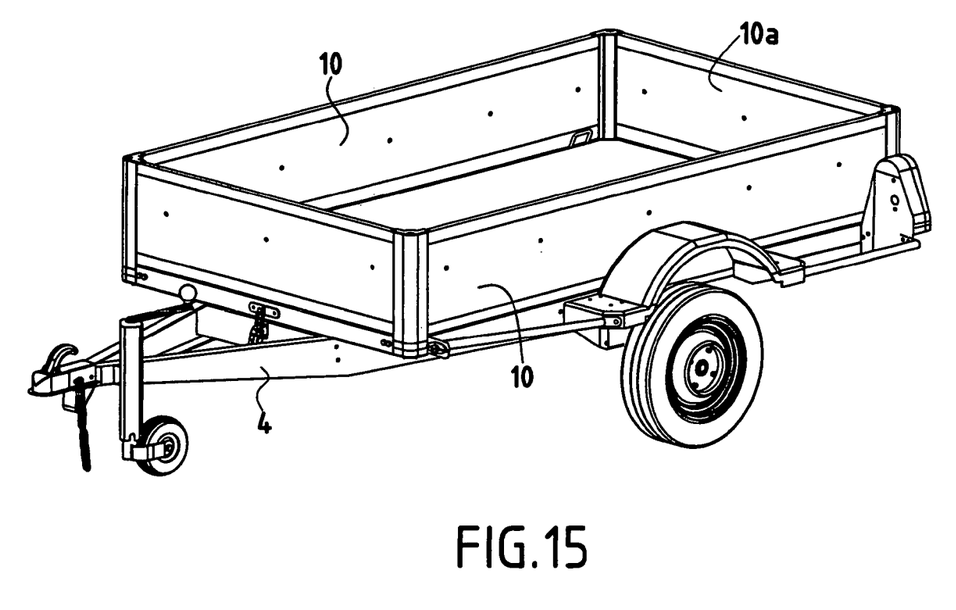
FIG. 15 is a perspective view of a trailer equipped with sidewalls.

FIG. 15 shows trailer equipped with its sidewalls 10 and 10a.

Figure 16A:
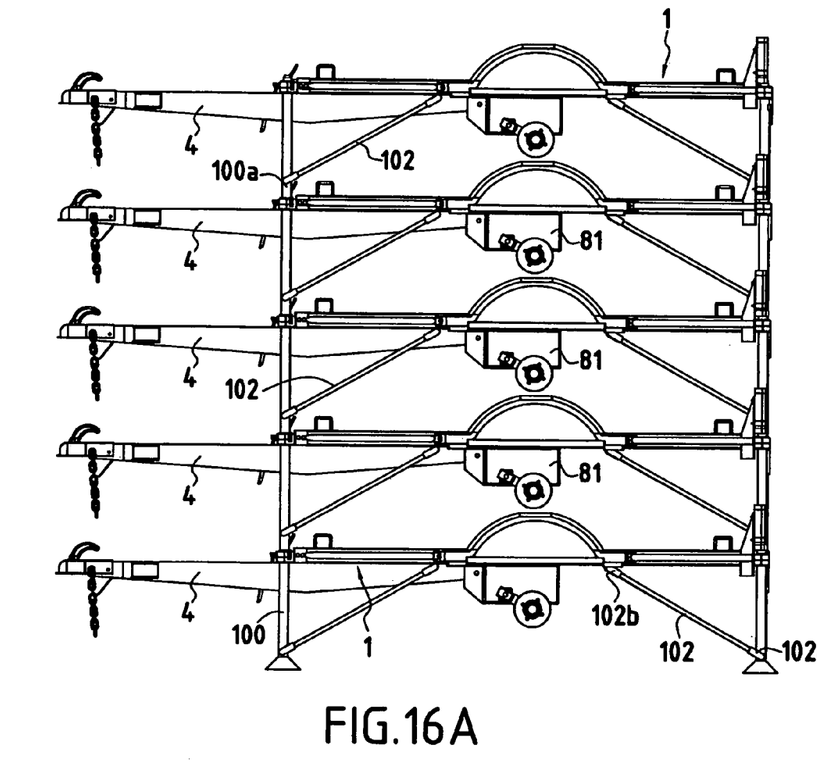
Figure 16B:
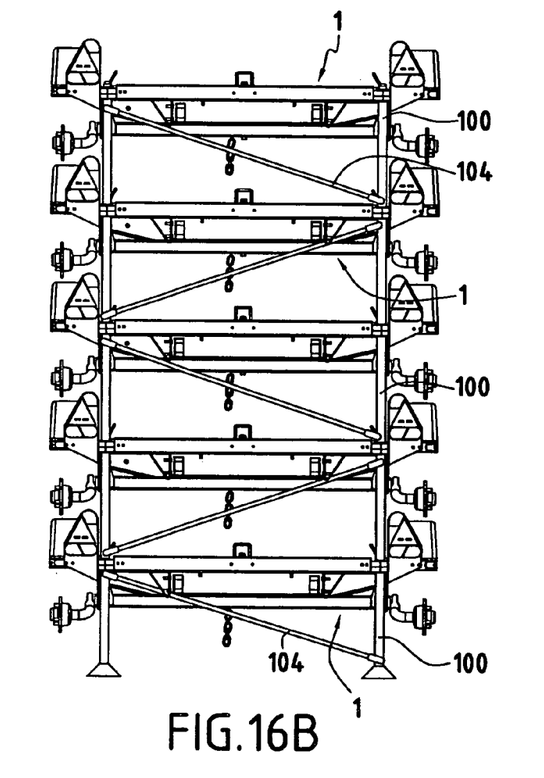

FIGS. 16A and 16B illustrate another advantage of the invention which consists of the possible stacking of trailers whose essential parts have already been assembled.

As can be seen in these figures the trailers are already equipped with their trailer tongue 4 and axle plates 81.

On the other hand, the sidewalls 10, 10a, corner posts 9 and wheels are removed.

Stacking is made possible by using the upright elements 100 whose ends are engaged in orifices 35 of the respective corner pieces 30 of two adjacent trailers. To rigidify the upright elements 100, struts 102 are provided of which one end 102a is fixed onto the upright element and the other end 102b is fixed in the lower groove 15a of frame 7 of the trailer.

Two cross struts 104 are also provided.

The invention claimed is:

1. A road trailer intended to be towed by a motor vehicle and comprising at least one cross axle (2) connected to two wheels (3) by two side suspension arms 19, a tongue (4) to hitch it to the vehicle, a body (6) mounted on the axle and the tongue and having a rectangular frame (7) supporting a floor (8) and sidewalls (10), said frame having two parallel side members (11a, 11b), a front cross bar (12) and a rear cross bar (13), characterized by the fact that the side members (11a, 11b) and cross bars (12, 13) are made from metal profiles (14) and are joined at their adjacent ends by means of corner pieces (30) having two perpendicular arms (31a, 31b) which respectively fit into said adjacent ends and which also have through orifice (35) perpendicular to the plane of said arms, said side members (11a, 11b) and said cross bars (12, 13) comprising on their inner face a fin (20) which extends inwardly towards the inside of the frame (7) and which is intended to support the floor (8), and on their lower and upper faces a groove (15a, 15b) leading into a channel (16a, 16b) and able to receive and immobilize in rotation bolt heads (17) and the lower edges of the sidewalls, and by the fact that it also comprises four tubular corner posts (9) whose lower ends fit into the orifices (35) of the corner pieces (30), said posts (9) having two vertical grooves (51a, 51b), in orthogonal planes, intended to receive the side edges of sidewalls (10), and wherein said posts (9) are made from a profile (50) having two orthogonal grooves (51a, 51b) and are equipped at their lower end with an assembly piece (40) for assembling onto a corner piece (30), the assembly piece (40) having a lower part (40a) which fits into the orifice (35) of a corner piece (30) and an upper part (40b) which fits into the lower end of a profile (50) of a post (9), and wherein the assembly piece (40) comprises angle positioning means (41, 47) and clipping means (43a, 43b, 48a, 48b) which respectively cooperate with conjugate angle positioning means (42, 55) and clipping means (57a, 57b) provided on the corner pieces (30) and the lower ends of the post profiles (9).

2. Trailer as in claim 1, characterised by the fact that the angle positioning means comprise a vertical groove (42, 47) provided on one of the pieces and a protuberance (41, 55) provided on the other piece.

3. Trailer as in claim 1 or 2, characterised by the fact that the clipping means comprise a protuberance (48a) formed on an elastic tongue (49a) of the assembly piece (40) and which is able to enter into a hole (57a, 57b) or slot provided in the post profile (9) or corner piece (30).

4. A road trailer intended to be towed by motor vehicle and comprising at least one cross axle (2) connected to two wheels (3) by two side suspension arms 19, a tongue (4) to hitch it to the vehicle, a body (6) mounted on the axle and the tongue and having a rectangular frame (7) supporting a floor (8) and sidewalls (10), said frame having two parallel side members (11a, 11b), a front cross bar (12) and a rear cross bar (13), characterized by the fact that the side members (11a, 11b) and cross bars (12, 13) are made from metal profiles (14) and are joined at their adjacent ends by means of corner pieces (30) having two perpendicular arms (31a, 31b) which respectively fit into said adjacent ends and which also have through orifice (35) perpendicular to the plane of said arms, said side members (11a, 11b) and said cross bars (12, 13) comprising on their inner face a fin (20) which extends inwardly towards the inside of the frame(7) and which is intended to support the floor (8), and on their lower and upper faces a groove (15a, 15b) leading into a channel (16a, 16b) and able to receive and immobilize in rotation bolt heads (17) and the lower edges of the sidewalls, and by the fact that it also comprises four tubular corner posts (9) whose lower ends fit into the orifices (35) of the corner pieces (30), said posts (9) having two vertical grooves (51a, 51b), in orthogonal planes, intended to receive the side edges of sidewalls (10), wherein the sidewalls (10) include a lower edge, the lower edge (70) including means (71) able to slide within the upper groove (15b) of a side member (11a, 11b) or cross bar, during assembly.

5. Trailer as in claim 4, characterised by the fact that the sidewalls are made in a sheet metal formed to have rigidifying horizontal ripples (72*a*).

6. Trailer as in claim 4, characterised by the fact that the sidewalls are made from a plurality of profiles which fit into each other one above the other.

7. Trailer as in claim 4, characterised by the fact that the sidewalls are made from wood panels which fit into a groove (74) provided in the upper part of sliding means in the upper groove of the side members or cross bars.

8. Trailer as in claim 7, characterised by the fact that the sliding means are made from a profile (75).

9. Trailer as in claim 8, characterised by the fact that the side members on their inner face below the grooves comprise a plurality of openings to receive the ends of intermediate cross bars.

10. Trailer as in claim 9, characerised by the fact that the side members (11*a*, 11*b*) are reinforced by longitudinal beams (80*a*, 80*b*) arranged either side of the axle under said side members and fixed to the latter by bolting, said beams (80*a*, 80*b*) being integral with an axle plate (81) designed to form a single beam under the platform of said trailer.

11. Trailer as in claim 10, characterised by the fact that the sidewalls (10, 10*a*) and posts (9) are removable.

12. Trailer as in claim 11, characerised in that said through orifices (35) of frame (7) of the trailer may be used to insert upright elements (100), after removing the corner posts (9), to allow the stacking of several trailers.

* * * * *